(12) United States Patent
Rivkin et al.

(10) Patent No.: US 9,978,401 B1
(45) Date of Patent: May 22, 2018

(54) CHIRPED CURRENT PROFILE WITH UNDERSHOOT FEATURE

(71) Applicant: SEAGATE TECHNOLOGY LLC, Cupertino, CA (US)

(72) Inventors: Kirill A. Rivkin, Edina, MN (US); Mourad Benakli, Eden Prairie, MN (US); Todd M. Lammers, Lafayette, CO (US); Ralph William Cross, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days. days.

(21) Appl. No.: 15/497,473

(22) Filed: Apr. 26, 2017

Related U.S. Application Data

(63) Continuation of application No. 15/242,382, filed on Aug. 19, 2016, now abandoned.

(51) Int. Cl.
  *G11B 5/02* (2006.01)
  *G11B 5/09* (2006.01)
  *G11B 5/012* (2006.01)
  *G11B 20/10* (2006.01)

(52) U.S. Cl.
  CPC ........... *G11B 5/09* (2013.01); *G11B 5/012* (2013.01); *G11B 20/10222* (2013.01)

(58) Field of Classification Search
  CPC ......... G11B 5/012; G11B 27/36; G11B 20/20; G11B 20/10009; G11B 5/09; G11B 20/1426; G11B 2220/90; G11B 5/02
  USPC ......... 369/116, 120, 122, 44.27; 360/25, 26, 360/31, 39, 44, 48, 68
  See application file for complete search history.

(56) References Cited

U.S. PATENT DOCUMENTS

| | | |
|---|---|---|
| 5,168,395 A | 12/1992 | Klaassen et al. |
| 5,724,201 A | 3/1998 | Jaffard et al. |
| 5,801,910 A | 9/1998 | Mallary |
| 6,128,146 A | 10/2000 | Ngo |
| 6,215,607 B1 | 4/2001 | Ngo |
| 6,297,921 B1 | 10/2001 | Price, Jr. et al. |
| 6,400,190 B1 * | 6/2002 | Lacombe .................. G11B 5/02 327/110 |
| 6,826,003 B1 | 11/2004 | Subrahmanyam |
| 6,970,316 B2 | 11/2005 | Venca et al. |
| 7,133,234 B2 | 11/2006 | Bloodworth et al. |
| 7,154,687 B2 | 12/2006 | Ikekame et al. |
| 7,982,996 B2 | 7/2011 | Smith et al. |
| 8,537,487 B2 | 9/2013 | Goldberg et al. |

(Continued)

*Primary Examiner* — Nabil Hindi
(74) *Attorney, Agent, or Firm* — Holland & Hart LLP

(57) ABSTRACT

Systems and methods for a providing a chirped current profile with an undershoot for a channel preamplifier are described. A method for writing bits in a magnetic recording disc may include applying an overshoot to a write current which is supplied to a magnetic writer of the magnetic recording disc and applying an undershoot to the write current after the overshoot is applied to at least partially de-saturate the magnetic writer. The method may also include writing a bit to the magnetic recording disc with the magnetic writer using the supplied write current. In some examples, the application of a short negative pulse after an overshoot portion of the write current waveform is delivered to the head during a write operation that writes the bit to the magnetic recording disc.

18 Claims, 9 Drawing Sheets

(56) References Cited

U.S. PATENT DOCUMENTS

| | | |
|---|---|---|
| 8,953,273 B1 | 2/2015 | Funayama |
| 2014/0050843 A1 | 2/2014 | Yi et al. |

* cited by examiner

CHIRPED CURRENT PROFILE WITH UNDERSHOOT FEATURE

RELATED APPLICATIONS

This application is a continuation application of U.S. patent application Ser. No. 15/242,382, filed on Aug. 19, 2016, abandoned, the disclosure of which is incorporated in its entirety by this reference.

SUMMARY

The present disclosure is directed to methods and systems for relaxing a pole in a magnetic write head during an active recording of a bit to a magnetic storage device. In some embodiments, the present systems and methods may improve drive performance by reducing the time required for the pole to relax after the initial transition of the bit written to the magnetic storage device. The present systems and methods may improve efficiency and user experience of a magnetic storage device.

A method for writing bits in a magnetic recording disc is described. In one embodiment, the method may include applying an overshoot to a write current which is supplied to a magnetic writer of the magnetic recording disc and applying an undershoot to the write current after the overshoot is applied to at least partially de-saturate the magnetic writer. The method may also include writing a bit to the magnetic recording disc with the magnetic writer using the supplied write current.

Applying the undershoot may further include applying a short, opposite-polarity pulse of current from the current polarity to the existing write current waveform (referred to herein as "write current") during a write operation that writes the bit to the magnetic recording disc.

The method may also include determining an undershoot current level for the undershoot based at least in part on an overshoot current level of the overshoot, wherein applying the undershoot further includes applying the undershoot current level to the magnetic writer.

In some examples, the method may include determining a write width for a previous bit written to the magnetic recording disc. The method may further include adjusting an undershoot current level for the undershoot based at least in part on the write width. The method may include determining a bit length of the bit to be written to the magnetic recording disc. In some examples, applying the undershoot to the write current may further include applying the undershoot when the bit length is equal to or above a threshold bit length. The method may also include truncating a time the undershoot is applied to the write current when the duration of the undershoot plus the delay before the undershoot is applied is greater than a bit cell time.

Examples of the method may include determining at least one of a magnitude, duration, and delay of the undershoot, wherein applying the undershoot further includes applying the undershoot with at least one of the determined magnitude of the undershoot, a duration of the undershoot, and a delay before the undershoot is applied. In some examples, applying the undershoot further includes applying a shift in one or more current pulses in the write current to produce an asymmetrical undershoot. The current value of the undershoot may be one of greater than or equal to a current steady-state value and less than or equal to a current steady-state value. The method may further include returning the write current to a steady state value before a next data transition.

In some examples, applying the undershoot to the write current may further include waiting for a delay period to expire after the overshoot is applied and applying the undershoot to the write current after a delay period has expired. The method may also include determining a duration of the undershoot, wherein applying the undershoot further includes applying the undershoot for the determined duration. Other examples of the method may include receiving an external signal that signals a timing, magnitude, and duration for the undershoot and applying the undershoot to the write current according to the external signal.

A device is also described. The device may include a preamplifier to supply a write current to a magnetic writer of a storage device and a write current device coupled between the preamplifier and the magnetic writer. In some examples, the write current device is configured to apply an overshoot to a write current which is supplied to the magnetic writer and apply an undershoot to the write current after the overshoot is applied to at least partially de-saturate the magnetic writer, wherein the magnetic writer writes a bit to the storage device using the modified write current.

A storage system apparatus is also described. The storage system apparatus may include a storage device having a magnetic write head and a preamplifier to supply a write current to the magnetic write head. The storage system apparatus may also include a write current device coupled between the preamplifier and the storage device, wherein the write current device modifies the write current supplied to the magnetic write head by applying an overshoot to the write current and applying an undershoot to the write current after the overshoot is applied to at least partially de-saturate the magnetic write head, wherein the magnetic write head writes a bit to the storage device using the modified write current. In some examples, the write current device includes a system-on-a-chip (SOC).

A storage system device is further described. The storage system device may include a preamplifier to supply a write current to a magnetic writer of a storage device, wherein the preamplifier comprises a circuit that modifies the write current to include an undershoot after an overshoot is applied, wherein the undershoot at least partially de-saturates the magnetic writer during writing of a bit to the storage device. The circuit may further include a first resistor in series with a second resistor, wherein there is a first impedance mismatch between the first resistor and the second resistor. The circuit may also include a third resistor in series with a fourth resistor, the third and fourth resistors being in parallel with the first and second resistors, wherein there is a second impedance mismatch between the third resistor and the fourth resistor.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following figures. In the appended figures, similar components or features may have the same reference label. Further, various components of the same type may be distinguished by following a first reference label with a dash and a second label that may distinguish among the similar components. However, features discussed for various components—including those having a dash and a second reference label—may apply to other similar components. If only the first reference label is used in the specification, the description is applicable to any one of the similar components having the same first reference label irrespective of the second reference label.

DETAILED DESCRIPTION

Figure 1:
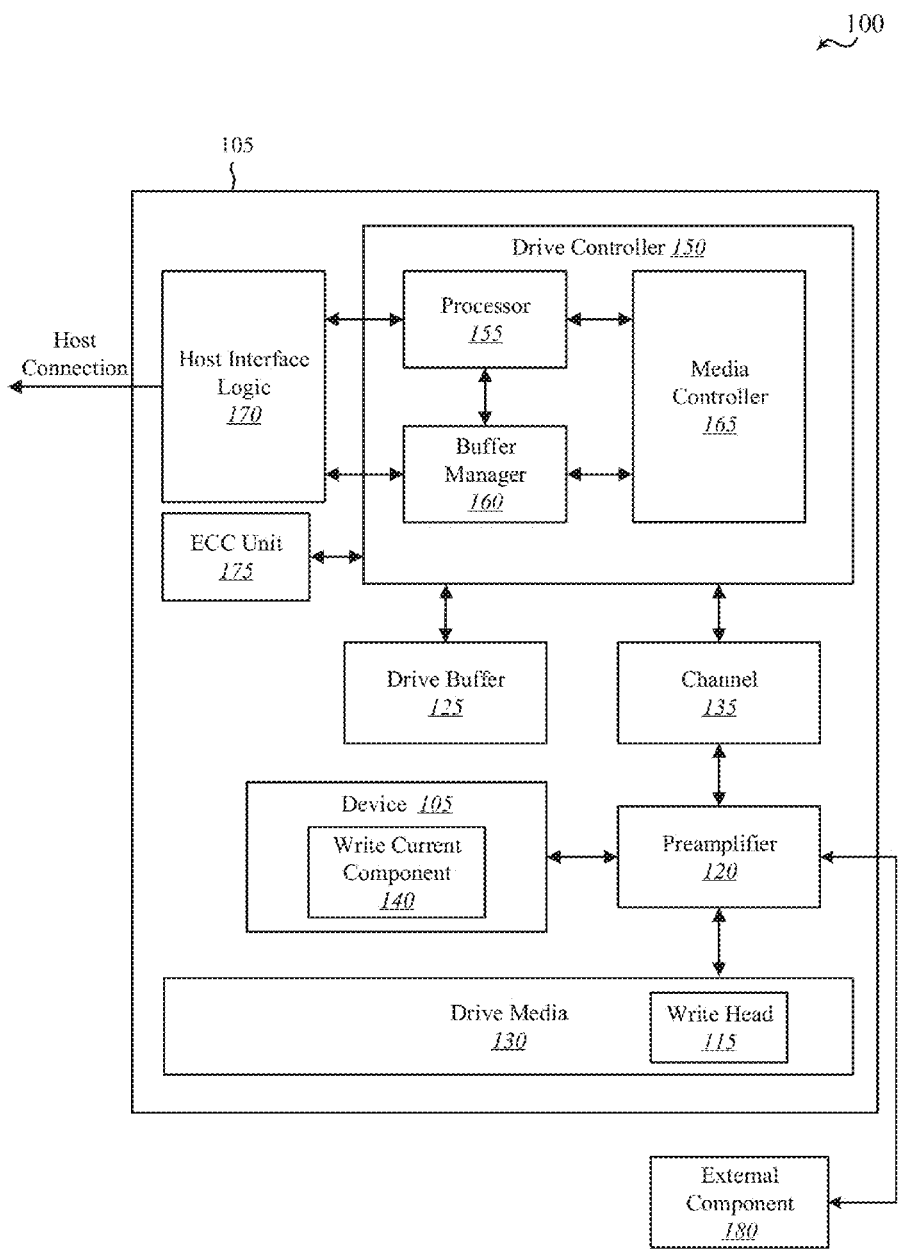
FIG. 1 shows a block diagram of an example apparatus in accordance with various aspects of this disclosure.

The following relates generally to the use of an undershoot in a write current to at least partially relax a pole of a magnetic write head, particularly during an active recording of a bit to a magnetic recording disc. A magnetic recording disc is a storage device that uses magnetized medium to digitally store data. Magnetic recording discs are a form of non-volatile memory. Information is written to a magnetic recording disc using one or more magnetic write heads (referred to generally herein as "write heads"). Information is read from a magnetic recording disc using one or more magnetic read heads.

A write head may write bits (e.g., a series of just 1s or just 0s) to the magnetic recording disc. A length of a bit may be determined based on how many 1s or 0s is in the bit. For a bit to be written, each of one or more magnetic poles of the write head may be in one of two states which correspond to opposite magnetic poles. When the magnetic recording disc is switching from writing a bit of one type to writing a bit of the other type (e.g., from writing 1s to writing 0s), the magnetic poles of the write head must at least partially flip magnetization. In other words, every time the data to be written switches from 1 to 0 or vice-versa, the magnetization of the write poles must reverse to the opposite magnetization. This transition to the opposite magnetization may take a substantial amount of time. Techniques described herein reduce that time by partially demagnetizing the magnetic poles before the bit is completely written. This reduced transition time improves the efficiency and speed of the magnetic recording disc, which in turn improves user experience.

One performance metric often used to characterize write heads is the time it takes for a write pole reversal. However, there are slower parameters which can be improved by using the chirped undershoot. For example, the processes related to domain wall motion and re-magnetization in side shields may become faster. Without the undershoot, these processes may occur on a nanosecond basis. During a long bit (e.g., writing many 1s or 0s), the write head may become substantially more saturated away from a tip of the pole, which would require larger current picks to ensure comparable risetime for the next bit. Previous solutions include increasing the overshoot after long bits or using pre-compensation to shift the time at which the current is being switched. Instead, the undershoot proposed herein reduces the saturation away from the pole tip during a bit write.

Additionally, as the write pole saturates, simply reducing the current does not result in a linear reduction in magnetic field. That is, the write pole is a non-linear system with significant dynamic hysteresis effect. This may be due to factors including shape anisotropy and the fact that magnetization dynamics may possibly follow exponential time dependence. Shape anisotropy may cause the write head pole tip to be somewhat aligned along a direction perpendicular to an air-bearing surface (ABS) of the magnetic recording disc, therefore helping to support significant magnetization of the pole tip unless torque (non-equilibrium magnetic field) is applied. A time constant of the magnetization dynamics may be inversely proportional to the torque present in the system. For example, a reduction of current by 10 milliamperes (mA) at first may exert only minor torque back in the paddle, underneath the coils, at the state which could reach substantial levels of saturation even during the overshoot portion of the current waveform. This can considerably effect the pole tip only after a substantial delay. These effects can become problematic as the write width is reduced in conventional systems. The techniques described herein may ensure that the transition to smaller write widths occurs within a short enough timeframe that the magnetization does not remain dominant for longer bits.

Overshooting the current level beyond a final steady state value may generate additional magnetic torque needed to achieve magnetization change within a limited timeframe. An undershoot (a "chirp" pulse) may be applied after the overshoot in order to de-saturate the write head. As used herein, an undershoot may be a decrease in coil current to lower levels than previous, such as the steady state value. In some examples, an undershoot may even acquire an opposite current value with respect to both the overshoot and steady state current amplitude.

Techniques described herein provide a time dependent current waveform with an undershoot section following an overshoot section. The undershoot section may be modifiable in amplitude, duration, and timing. A purpose of this "chirped" current profile (e.g., having the undershoot) may be to substantially speed up magnetic desaturation of the write head. This may result in the magnetic saturation of the write head being almost directly determined by the steady state current amplitude for long bits. In some examples, the steady state current amplitude may be substantially below a saturation knee amplitude.

Techniques described herein provide methods, devices, and systems that decrease the write widths of long bits with limited degradation of the transition quality. The methods, devices, and systems also may improve the risetime and risetime delay, especially after long bits. Side track erasure may also be improved and dynamic saturation of the trailing shield is provided. Because the write widths can be reduced using the undershoot feature, the track density of the magnetic recording disc may be improved.

FIG. 1 shows a block diagram 100 of an apparatus 103 for use in electronic communication, in accordance with various aspects of this disclosure. The apparatus 103 may include a drive controller 150, a drive buffer 125, a host interface logic 170, a channel 135, a preamplifier 120, a device 105, and a drive media 130. Each of these components may be in communication with each other and/or other components directly and/or indirectly.

Using a current source, the preamplifier 120 may supply one or more write heads 115 of the drive media 130 with a write current. The device 105 may cause the preamplifier 120 to apply an undershoot to the write current, after an overshoot has been applied to the write current, in order to at least partially de-saturate the write head 115.

The drive media 130 may also be referred to herein as a storage device. The drive media 130 may include one or more magnetic recording discs. The drive media 130 may include any combination of hard disc drives, solid state drives, and hybrid drives, or combinations thereof, that include both hard disc and solid state drives. In some embodiments, the systems and methods described herein may be performed on a single magnetic recording disc storage device. The techniques described herein may also apply to different recording and storing strategies, such as, for example, shingled magnetic recording (SMR), heat-assisted magnetic recording (HAMR), multi-sensor magnetic recording (MSMR), and the like. In some cases, the techniques described herein may be performed on multiple storage devices or a network of storage devices. Examples of the drive media 130 may include a storage server, a storage enclosure, a storage controller, storage drives in a distributed storage system, storage drives on a cloud storage system, storage devices on personal computing devices, storage devices on a server, or any combination thereof.

In some configurations, the device 105 may include a write current component 140. In one example, the device 105 may be coupled to the preamplifier 120. In other examples, the device 105 may be part of the preamplifier 120. In some embodiments, the device 105, the preamplifier 120, and the drive media 130 may be components of a magnetic recording disc. Alternatively, the device 105 and the preamplifier 120 may be a component of a host (e.g., operating system, host hardware system, etc.) of the drive media 130.

In other examples besides the one shown in FIG. 1, the device 105 may be a computing device with one or more processors, memory, and/or one or more storage devices. In some cases, the device 105 may include a wireless storage device. In some embodiments, the device 105 may include a cloud drive for a home or office setting. In one embodiment, the device 105 may include a network device such as a switch, router, access point, or any combination thereof. In one example, the device 105 may be operable to receive data streams, store and/or process data, and/or transmit data from, to, or in conjunction with one or more local and/or remote computing devices.

The device 105 may include a database. In some cases, the database may be internal to the device 105. For example, a storage device, such as the drive media 130, may store a database. Additionally, or alternatively, the database may include a connection to a wired and/or a wireless database. Additionally, as described in further detail herein, software and/or firmware (e.g., stored in memory) may be executed on a processor of the device 105. Such software and/or firmware executed on the processor may be operable to cause the device 105 to monitor, process, summarize, present, and/or send a signal associated with the operations described herein.

Some examples include an external component 180 coupled to the preamplifier 120. In some examples, the external component 180 is coupled to the device 105. The external component 180 may connect to either of these components via a wired or wireless connection. The external component 180 may provide an external signal to the device 105 or the preamplifier 120. Such an external signal may modify the undershoot applied to the write current.

In one embodiment, the drive media 130 may be internal to the device 105. As one example, the device 105 may include a storage controller that interfaces with storage media of the drive media 130.

One or more of the components of the apparatus 103, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

In one embodiment, the drive controller 150 may include a processor 155, a buffer manager 160, and a media controller 165. The drive controller 150 may process, via the processor 155, read and write requests in conjunction with the host interface logic 170, which acts as an interface between the apparatus 103 and a host of apparatus 103 (e.g., an operating system, host hardware system, etc.). The drive buffer 125 may hold data temporarily for internal operations of the apparatus 103. For example, a host may send data to the apparatus 103 with a request to store the data on the drive media 130. The drive controller 150 may process the request and, through the channel 135 and the preamplifier 120, cause the drive media 130 to store the received data. In some cases, a portion of data stored in the drive media 130 may be copied to the drive buffer 125 and the processor 155 may process or modify this copy of data and/or perform an operation in relation to this copy of data held temporarily in the drive buffer 125.

Although depicted outside of the drive controller 150, in some embodiments, the device 105 may include software, firmware, and/or hardware located within the drive controller 150. For example, the device 105 may include at least portions of the processor 155, the buffer manager 160, and/or the media controller 165. In one example, the device 105 may include one or more instructions executed by the processor 155, the buffer manager 160, and/or the media controller 165. The device 105 may be configured to apply an undershoot to a write current that the preamplifier 120 supplies to the drive media 130 during a write operation. The device 105 may apply the undershoot during an active bit write after an overshoot is applied to the write current. The device 105 may modify the undershoot based on parameters determined from certain conditions or user programmable parameters.

Figure 2A:
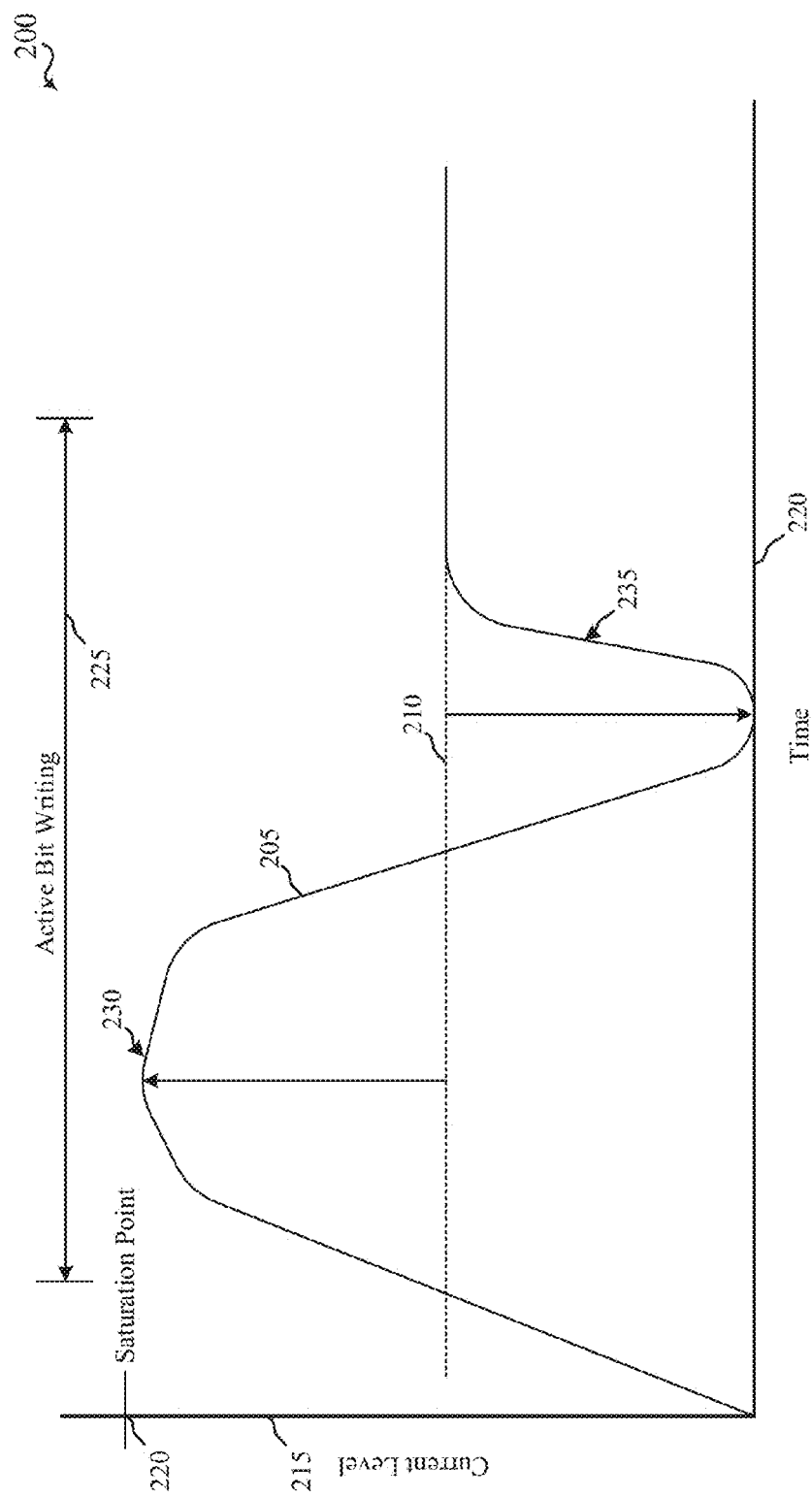
FIGS. 2A and 2B show graphs of examples of write currents that may be supplied to a magnetic write head according to aspects of the disclosure.

FIG. 2A shows a graph 200 of an example of a write current 205 that may be supplied to a magnetic write head. A preamplifier, such as the preamplifier 120 of FIG. 1, may supply the write current 205 to a write head, such as the write head 115 of FIG. 1. The graph 200 shows a current level 215 over time 220. The write current 205 includes an overshoot 230 and an undershoot 235. The undershoot 235 happens after the overshoot 230 is applied, during an active bit writing time 225. A current value 210 is a steady-state current value, and saturation point 220 is a current value corresponding to a maximum magnetic saturation of the one or more poles of the write head.

The undershoot 235 may be a decrease in the write current 205 due to a decrease in coil current to lower levels than the write current 205 was previously at. For example, the undershoot 235 may be due to a drop in current from the steady state value 210. The undershoot 235 may be a short pulse of current to the write current 205 during a write operation that writes a bit to a magnetic recording disc. In some examples, the undershoot 235 may be a short negative pulse of current. The undershoot 235 may help to demagnetize the poles of the magnetic read head. After the undershoot 235 is applied, the write current 205 may be returned to the steady-state value 210. The steady-state value 210 may be somewhat lower than a saturation knee in some examples.

The undershoot 235 may at least partially de-saturate the write head after the overshoot is applied. The duration of the undershoot may be based on one or more of several parameters. Such parameters may include a risetime, amplitude, and duration of the overshoot, and a selected duration parameter. An example amplitude of the undershoot 235 may be in the range of approximately −30 mA to 30 mA. In other designs, other amplitudes are used for the undershoot 235. In one example, the duration of the undershoot may be approximately 100-100 picoseconds (ps). Other time ranges for the duration may be used. For example, smaller values may be used for designs that use narrower write widths.

The parameters of the undershoot and overshoot may be interconnected with one another. For example, increasing the overshoot amplitude may potentially improve the transition time, however it may also require changing the undershoot amplitude. These parameters may be locally chosen for specific performance. One example conventional waveform may have a very fast (50 ps) overshoot risetime, a substantial overshoot amplitude with a very fast overshoot duration, followed by quick decay of current amplitude towards the steady state values. This kind of profile does allow for some write width control, as it prevents writer from substantially saturating and therefore can be effective in write width reduction, especially with 1 turn designs with low recess of the coil. However, due to the need to have fast overshoot, this design is associated with very large erasure. An example waveform according to the techniques described herein is shown in FIG. 2A. The write current 205 has a substantial overshoot risetime (150 ps), which together with the overshoot duration roughly encompasses the entire length of 1 T bit, followed by undershoot to −20 mA. The write current 205 then returns to steady state amplitude.

Effects of the current profile of the write current 205 may be a significant reduction of write width and increase in track density. In some examples, these benefits may come at the expense of some reduction of transition quality. The following effects interplay. Worse transition signal-to-noise ratio (SNR) due to transition between an unsaturated state (e.g., reduced field and write width) and saturated or unsaturated state rather than between two saturated states. However this effect may be partially offset by better risetime and risetime delay.

As side shields are also unsaturated and undergo less extreme dynamic changes, track erasure is improved. However, because the write width is reduced some substantial saturation of the write pole during the overshoot segment might result in worse erasure. Further, the amplitude of the write field used to write long bits may be reduced proportionally with the write width. This means that the DC erased signal to noise ratio (DCSNR) may be reduced. Some examples do not allow a reverse overwrite to drop below the DCSNR level at which the previously written bit become a source of additional noise. Since at reduced saturation, approximately the same write width corresponds to larger set of states, write to write variations increase proportionally.

In some examples, even a very small reduction of the write field (for example, to about 95% of the maximum amplitude) may improve the transition quality because erasure and risetime benefits outweigh insignificant reduction in the magnetic field. However, a larger reduction may be used to achieve a desired analog to digital conversion (ADC). For example, a reduction leading to writing with 85% of the nominal write plus erase (WPE) may be used. Other reductions of the write field may be used in other examples.

Figure 2B:
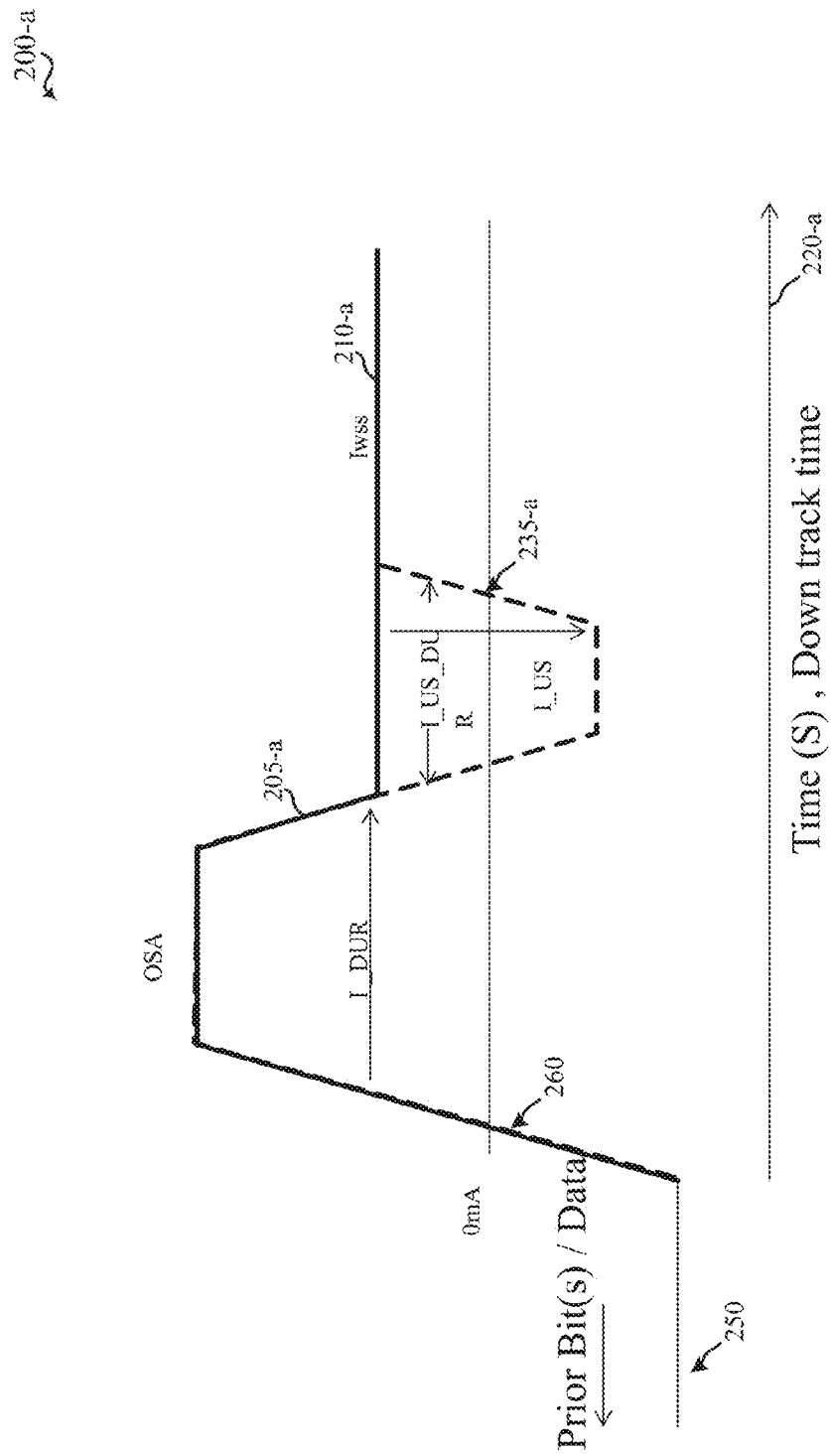

FIG. 2B shows a graph 200-a of an example of a write current 205-a that may be supplied to a magnetic write head. A preamplifier, such as the preamplifier 120 of FIG. 1, may supply the write current 205-a to a write head, such as the write head 115 of FIG. 1. The graph 200-a shows a waveform of the write current 205-a over time 220-a. The write current 205-a includes an overshoot 230-a and an undershoot 235-a. The undershoot 235-a happens after the overshoot 230-a is applied, during an active bit writing. A current value 210-a is a steady-state current value.

The graph 200-a also illustrates a section 250 where prior bits were written to the storage media. The graph 200-a also shows a transition 260 where the write current 205-a ramps up to write a bit to the storage media. Also illustrated are configurable aspects of the undershoot 235-a as described herein.

Figure 3A:
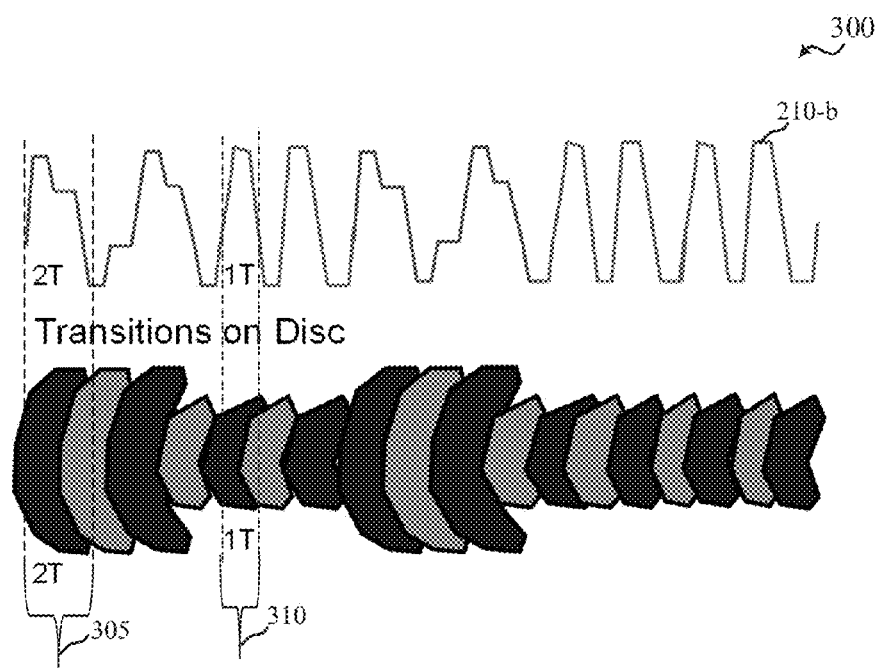
FIGS. 3A-3B show conceptual diagrams of write widths and corresponding write head currents.

FIG. 3A illustrates a conceptual diagram 300 of write widths and corresponding write head currents. FIG. 3A includes a write current 210-b and shows the corresponding transitions on the drive media, such as the drive media 130 of FIG. 1. A current portion 305 corresponds to an example 2 T bit time (down-track) and shows the length of 2 bits. A current portion 310 corresponds to an example 1 T bit time (down-track) and shows the length of 1 bit.

Figure 3B:
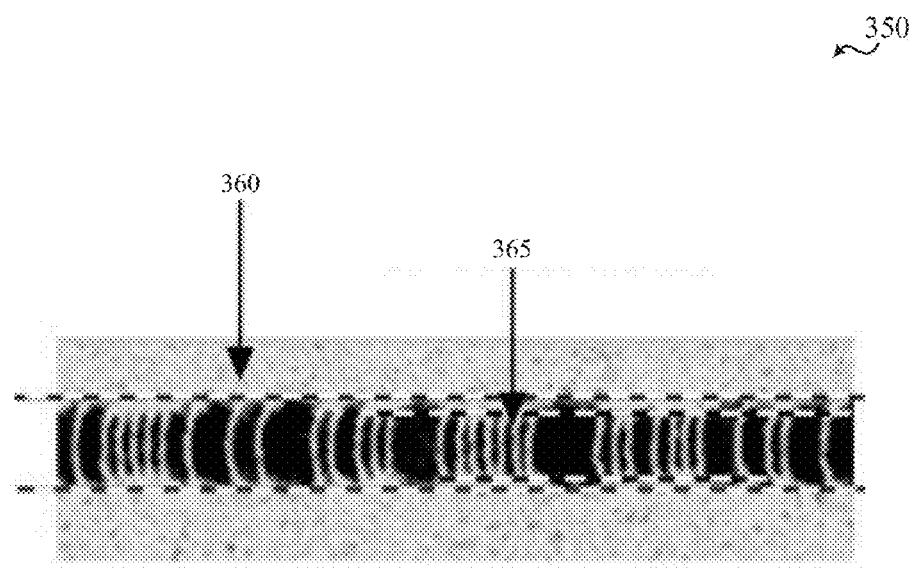

FIG. 3B provides a conceptual image 350 of the write widths of the current portions 305 and 310 of FIG. 3A. The portion 360 corresponds to the 2T bit time of the current portion 305. The portion 365 corresponds to the 1T bit time of the current portion 310. Other examples are possible and FIG. 3B is merely one description.

Figure 4:
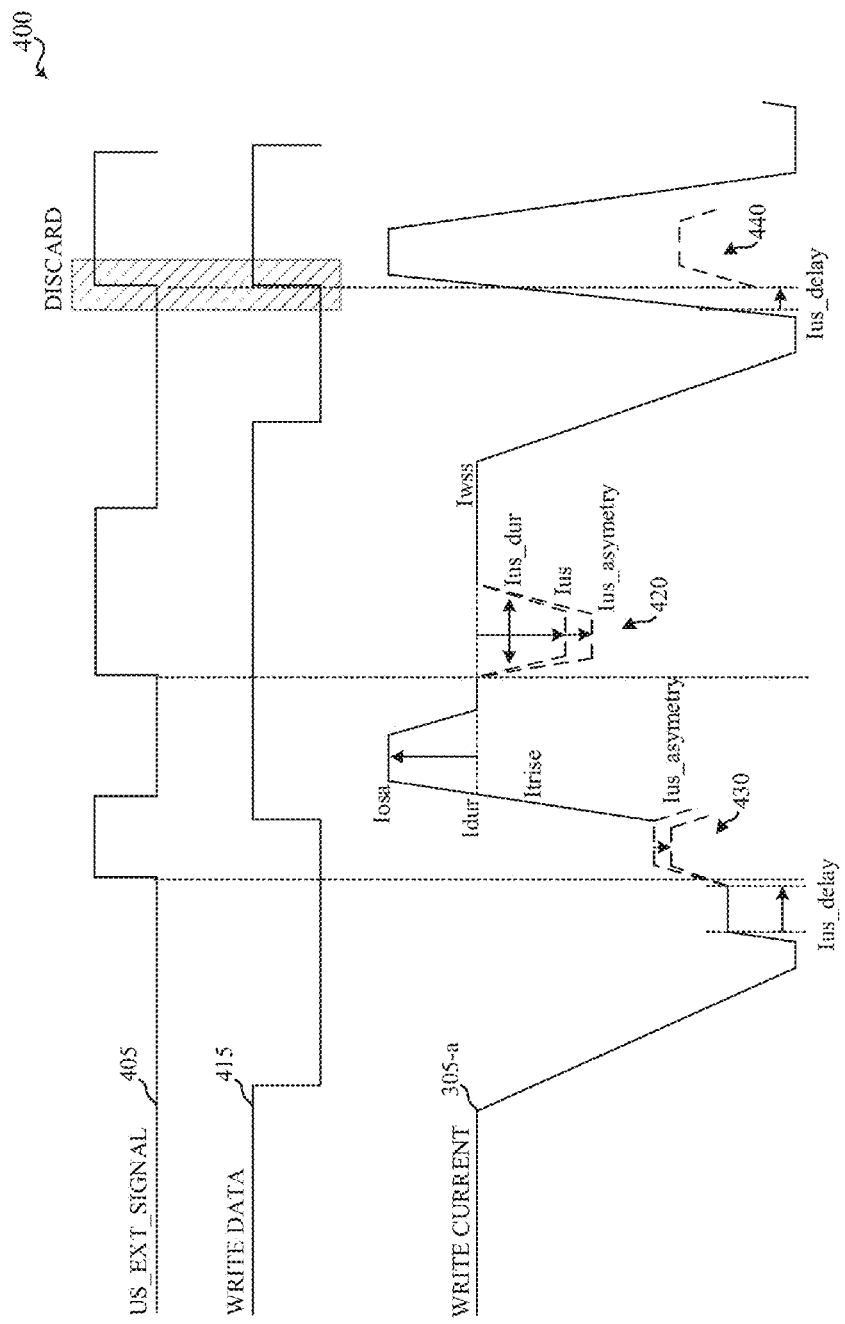
FIG. 4 shows a graph of other examples of a write current that may be supplied to a magnetic write head and signals.

FIG. 4 shows a curve 400 of another example of a write current 205-a that may be supplied to a magnetic write head. The curve 400 shows a waveform for the write current 205-a of current over time, as similar to the graph 200 of FIG. 2A. A preamplifier, such as the preamplifier 120 of FIG. 1, may supply the write current 205-a to a write head, such as the write head 115 of FIG. 1. Waveforms for example external signals 405 (US_EXT_SIGNAL) and write data 415 are also shown.

The techniques described herein may introduce a wave-shaping control variable into the preamplifier write driver circuitry. Legacy features that are user programmable include Iwss (Steady State), Iosa (Overshoot), Idur (Duration), and Itrise (Rise time). Programmable variations of these features can be applied to all magnetic transitions or just some of the transitions based on the bit length. Here, three additional user programmable control may be added to describe the magnitude, duration, and delay of the undershoot. These include Ius (e.g., a current level for the undershoot), Ius_dur (e.g., an undershoot duration), and Ius_delay (e.g., an undershoot start delay). FIG. 4 shows these controls and what features on the waveform they control.

An example approximate scale and magnitude of the control knobs of programmable registers in a preamplifier is as follows. For Ius, the magnitude of the undershoot itself may have a range of approximately 0 to 90 mA, for example. The pulse may produce an undershoot greater than or equal to a maximum value of Iwss. An example maximum Iwss may be around 60 mA. If the Ius is approximately 90 mA and Iwss is approximately 60 mA, the result will be an undershoot that extends down from 60 mA to a minimum of −30 mA.

The placement of the undershoot can follow immediately after the main overshoot pulse and the duration (Ius) has expired, or it can be delayed. The parameter Ius_delay may be set to delay the placement of the undershoot. For example, if the IOSD is 0, the natural decay time may be around 150 ps or it can be delayed in 20-50 ps increments from that point up to 1 ns or longer. For example if a Iosd duration is programmed by the user to be 600 ps and the Ius_delay is programmed to be 1 ns, then the time at which the undershoot occurs relative to the rising edge is 1.6 nS or 1 nS after the overshoot duration timer has expired.

The parameter Ius_dur controls the width of the chirped pulse itself and can be programmable. For example, Ius_dur can be in approximately a range of 100 ps to 600 ps or more.

The parameters Ius_asymetry and Ius_asym_pol may apply a shift or offset in the positive/negative pulses producing an asymmetric undershoot. The magnitude of the offset may be either added or subtracted from both polarities and may be on the order of 15-30 mA. The polarity of the offset can be selected via a Ius_asym_pol bit.

FIG. 4 illustrates three example cases relative to bit cell timing. Case 1 is represented in FIG. 4 as portion 420 of the write current 205-a. In case 1, the Ius_delay plus Idur is sufficiently less than the bit cell time, the full undershoot pulse is applied and the write current 205-a will fully return to the programmed Iwss value before proceeding to the next data transition.

Case 2 is represented as portion 430 of the write current 205-a. Case 2 occurs when only Ius_delay is less than the bit cell time but the sum of Ius_dur plus Ius_delay is greater than the bit cell time, the chirp pulse is allowed to start but the duration of the pulse is truncated at the next data transition and the polarity is allowed to reverse. This produces a shelf like waveform prior to the next transition. The Idur timer may be truncated at the data transition boundary and the transition proceeds to the opposite polarity.

Case 3 is represented as portion 440 of the write current 205-a. If Ius_delay is larger than the entire bit cell time (in other words, a data transition is received before the Ius_delay timer has expired), the undershoot is not applied and all timers are reset for the next transition. If a string of transitions are all shorter than the Ius_delay, then none of them will observe an undershoot.

In some examples, an external signal, such as US_EXT_SIGNAL 405, may be provided to the preamplifier to adjust the write current 205-a. Rises or falls of the US_EXT_SIGNAL 405 may affect the write current 205-a.

The methods described above may be used with the general asymmetric writing and uni-polar writing methods for the rest of the waveform features (i.e., if the waveform or any part of the waveform is shifted, the Ius applies to relative to that shift). Additional asymmetry may be applied directly via the Ius_asymmetry in addition to any other asymmetric shifting of the rest of the signal (i.e., the Iwss can be asymmetrically shifted negative, while the Ius_asym can be shifted positive).

Figure 5A:
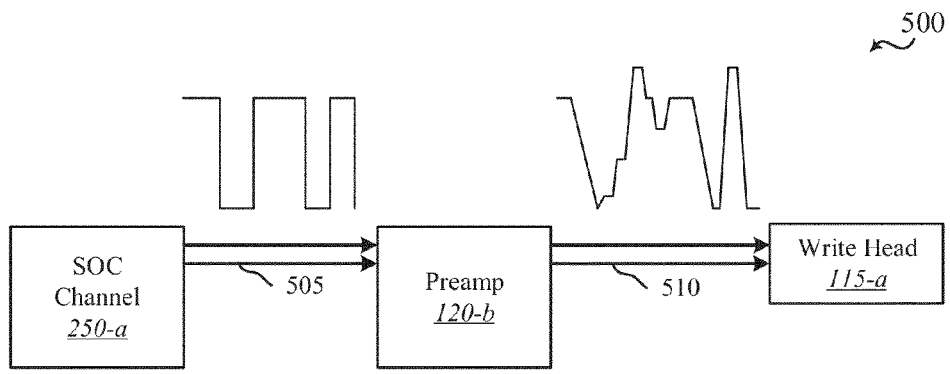
FIGS. 5A-5B show block diagrams of example input and output signals for a preamplifier.

FIG. 5A shows a block diagram of example input and output signals for a preamplifier 120-b. The preamplifier 120-b may be an example of one or more aspects of the preamplifier 120 of FIG. 1. An SOC channel 135-a provides write data 505 to the preamplifier 120-b. The preamplifier 120-b may supply the write current 205 to a write head 115-b. The SOC channel 135-a may be an example of one or more aspects of the channel 135 of FIG. 1. The write head 115-a may be an example of one or more aspects of the write head 115 of FIG. 1. The preamplifier 120-b provides the write data 505 and a write current 510 to the write head 115-a.

In some examples, no additional hardware lines from either the SOC channel 135-a nor the preamplifier 120-b are needed to signal when the undershoot pulse should occur. This may keep complexity and die size minimal for both the SOC channel 135-a and the preamplifier 120-b.

Figure 5B:
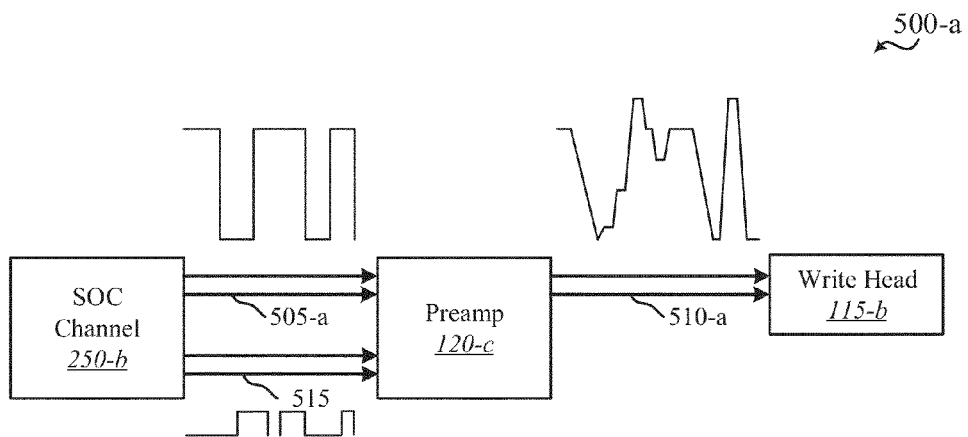

FIG. 5B shows a block diagram of example input and output signals for a preamplifier 120-c. The preamplifier 120-c may be an example of one or more aspects of the preamplifier 120 of FIGS. 1, 2, and 5B. An SOC channel 135-b provides write data 505-a and an external signal 515 to the preamplifier 120-b. The preamplifier 120-b may supply the write current 510-a to a write head 115-b. The SOC channel 135-a may be an example of one or more aspects of the channel 135 of FIG. 1 or 5A. The write head 115-b may be an example of one or more aspects of the write head 115 of FIG. 1 or 5A.

Figure 6:
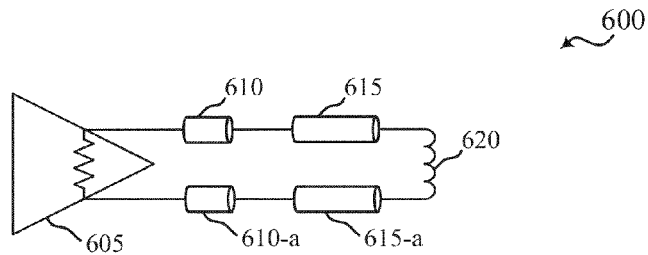
FIG. 6 shows a circuit diagram of an example circuit that may be included in a preamplifier in accordance with various aspects of this disclosure.

FIG. 6 shows a circuit diagram of an example circuit 600 that may be included in a preamplifier in accordance with various aspects of this disclosure. The circuit 600 may be a flex circuit located prior to a head gimbal assembly (HGA) attach. The circuit 600 may exacerbate an opposing polarity undershoot immediately following the main overshoot. The circuit 600 may modify the write current to include an undershoot after an overshoot is applied, wherein the undershoot at least partially de-saturates the magnetic writer during writing of a bit to the storage device. The circuit 600 may be used instead of, or in addition to, the methods described above to apply the undershoot.

The circuit 600 includes an amplifier 605 coupled to an inductor 620. Two resistors 610 and 615 may be between the amplifier 605 and the inductor 620 on separate lines. The circuit 600 may include the first resistor 610 in series with a second resistor 615, wherein there is a first impedance mismatch between the first resistor 610 and the second resistor 615. The circuit 600 may also include a third resistor 610-a in series with a fourth resistor 615-a which are in parallel with the first and second resistors 610 and 615, wherein there is a second impedance mismatch between the third resistor 610-a and the fourth resistor 615-a. In some examples, the resistors 610 and 610-*a* have a same impedance and the resistors 615 have a same impedance different from that of the resistors 615-*a*. In some examples, the resistors 610 and 610-*a* are Z_Tga resistors and the resistors 615 and 615-*a* are PCC resistors. The PCC resistors 615 and 615-*a* may have a much higher impedance than the Z_Tga resistors 610 and 610-*a*.

By intentionally reducing the output impedance significantly, an undershoot can be realized immediately after the main overshoot pulse. In this scenario, the pulse duration is largely unchangeable unless interconnect impedance profiles are used to extend the duration via the theory of multiple reflections. This method may reduce the depth of the undershoot. The magnitude of the undershoot may be directly related to the amount of overshoot programmed and the steady state.

Figure 7:
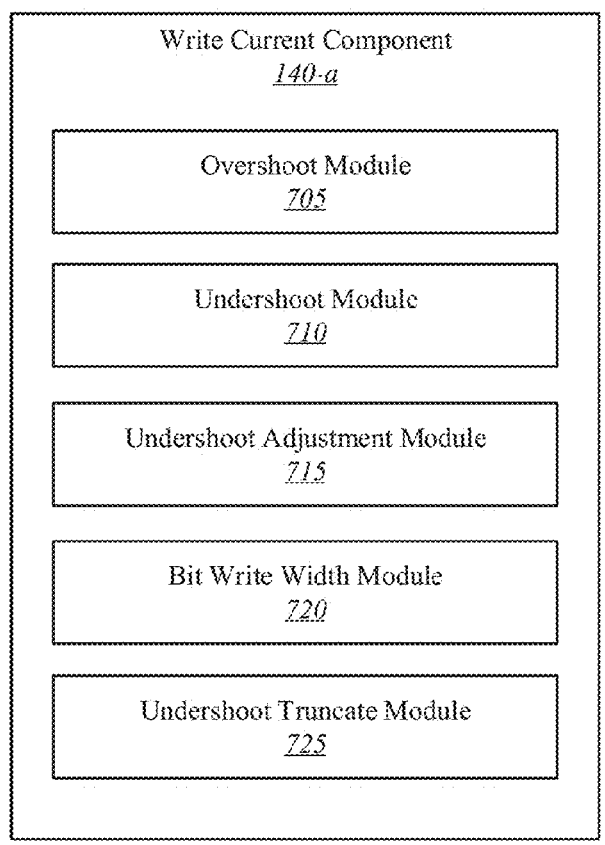
FIG. 7 shows a block diagram of one or more example modules in accordance with various aspects of this disclosure.

FIG. 7 shows a block diagram of one or more example modules of a write current component 140-*a* in accordance with various aspects of this disclosure. The write current component 140-*a* may be an example of one or more aspects of the write current component 140 of FIG. 1. The write current component 140-*a* includes an undershoot module 705, an overshoot module 710, an undershoot adjustment module 715, a bit write width module 720, and an undershoot truncate module 725.

The overshoot module 705 applies an overshoot to a write current which is supplied to a magnetic writer of a magnetic recording disc. In some examples, the overshoot module 705 may return the write current to a steady state value before a next data transition.

The undershoot module 710 applies an undershoot to the write current after the overshoot is applied to at least partially de-saturate the magnetic writer. The undershoot module 710 may apply a short pulse of current to the write current during a write operation that writes the bit to the magnetic recording disc. In some examples, the undershoot module 710 may apply the undershoot with the current level determined by the undershoot adjustment module 715. In some examples, the undershoot module 710 applies the undershoot to the write current after a delay period has expired. The application of the undershoot may be causal such that the write current component 140-*a* does not have to have a prior knowledge of the prior or upcoming bits.

The undershoot adjustment module 715 may determine an undershoot current level for the undershoot based at least in part on an overshoot current level of the overshoot. The undershoot adjustment module 715 may also determine at least one of a magnitude, duration, and delay of the undershoot. Applying the undershoot may further include applying the undershoot with at least one of the determined magnitude of the undershoot, a duration of the undershoot, and a delay before the undershoot is applied. The undershoot module 710 may apply a shift in one or more current pulses in the write current to produce an asymmetrical undershoot. The undershoot adjustment module 715 may determine a duration of the undershoot and the undershoot module 710 may apply the undershoot for the determined duration. In some examples, the undershoot adjustment module 715 receives an external signal that signals a timing, magnitude, and duration for the undershoot and applies the undershoot to the write current according to the external signal.

The bit write width module 720 may adjust a write width for the bit to be written to the magnetic recording disc based on feedback from the write width of a previously written bit. The undershoot current level may be adjusted based at least in part on the previous bit's width. The bit write width module 720 may also determine a bit length in time of the bit to be written to the magnetic recording disc. In some examples, applying the undershoot to the write current further includes applying the undershoot when the bit length is equal to or above a threshold bit length. The threshold bit length may be a duration of the bit length in time.

The undershoot truncate module 725 may truncate a time the undershoot is applied to the write current when the duration of the undershoot plus the delay before the undershoot is applied is greater than a bit cell time.

Figure 8A:
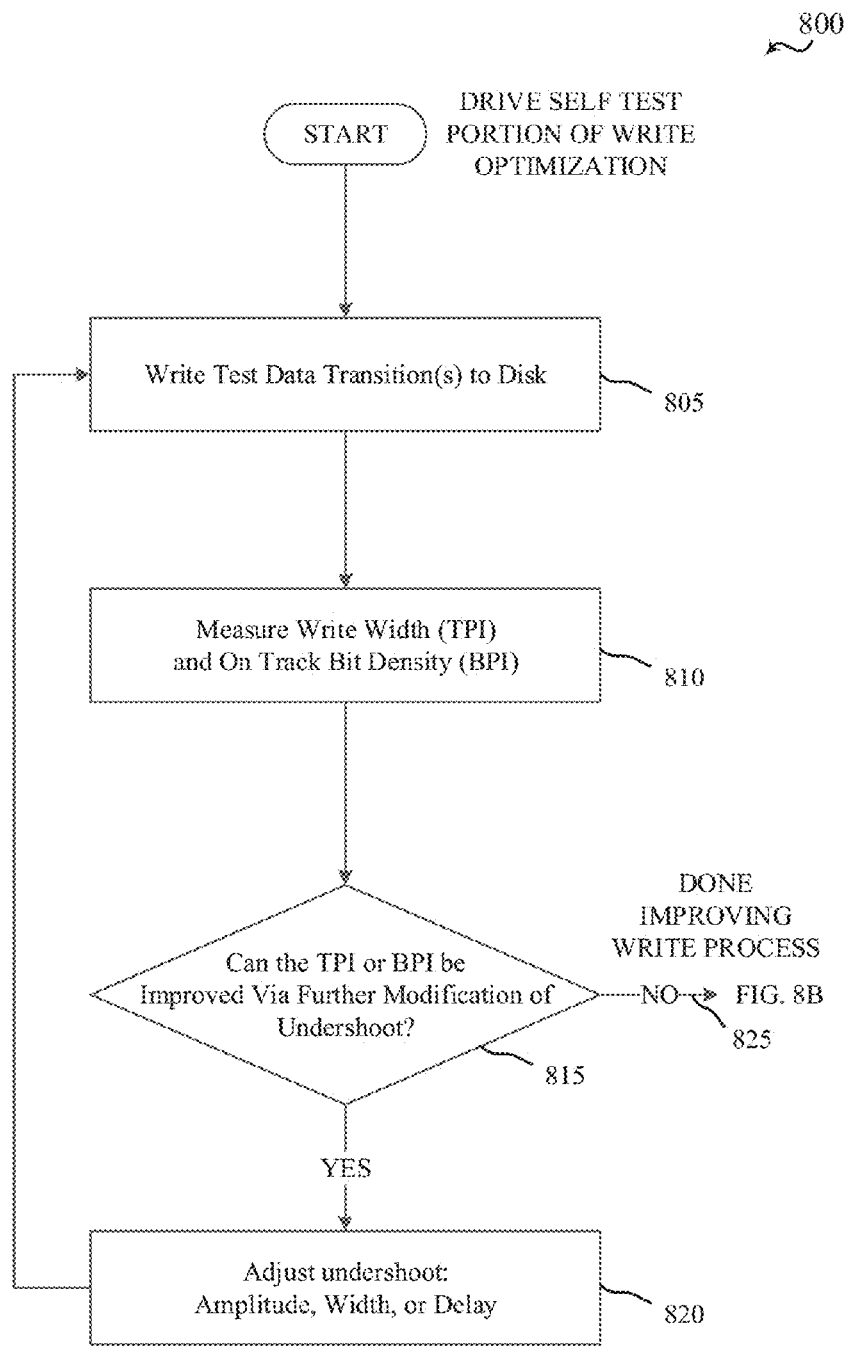
FIGS. 8A-8B are flow charts illustrating an example of a method in accordance with various aspects of this disclosure.

FIG. 8A is a flow chart illustrating an example of a method 800 in accordance with various aspects of this disclosure. One or more aspects of the method 800 may be implemented in conjunction with the device 105 of FIG. 1, the circuit 600 of FIG. 6, and/or the write current component 140 depicted in FIGS. 1 and 7. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

The method 800 begins at block 805 with writing one or more test data transitions to the magnetic recording disc. The method 800 measures the write width (in tracks per inch, for example) and the on track bit density (BPI) of the test at block 810. At block 815, the method 800 determines whether the TPI or the BPI could be improved by further modification of the undershoot. If so, the method proceeds to block 820, where the undershoot is adjusted in one of amplitude, width, or delay. If the TPI nor the BPI could be improved by further medication of the undershoot, the method 800 is done improvising the write process at this stage, and the method 800 proceeds along path 825 to FIG. 8B.

Figure 8B:
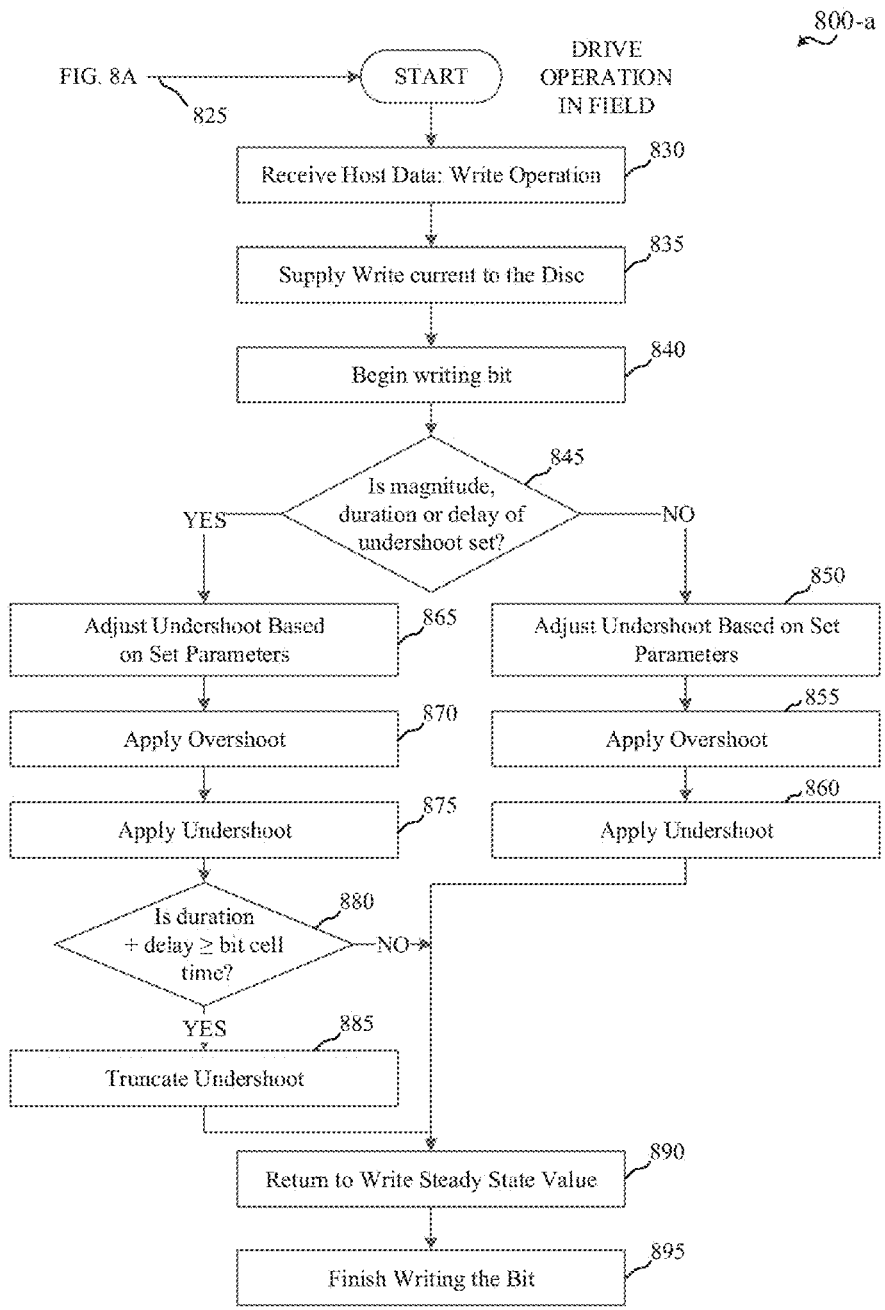

FIG. 8B is another flow chart illustrating an example of a method 800-*a* in accordance with various aspects of this disclosure. The method 800-*a* may be combined with the method 800 of FIG. 8A. One or more aspects of the method 800-*a* may be implemented in conjunction with the device 105 of FIG. 1, the circuit 600 of FIG. 6, and/or the write current component 140 depicted in FIGS. 1 and 7. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

FIG. 8B begins at path 825 from FIG. 8A and proceeds to block 830 with receiving a write operation at a drive controller of a magnetic recording disc. The method 800-*a* further includes supplying write current to the magnetic recording disc at block 835. Block 835 may be performed by a preamplifier and/or device as described herein. The write head may begin to write the bit at block 840.

At block 845, the method 800-*a* includes determining whether a magnitude, duration, or delay of the undershoot has been set. If not, the method 800-*a* proceeds to block 850. If so, the method 800-*a* proceeds to block 865.

At block 850, the undershoot is adjusted based on the set parameters. At block 855, the overshoot is applied. At block 860, the undershoot is applied after application of the overshoot. The method 800-*a* then proceeds to block 890, returning the current value to the write steady state value.

Alternatively, at block 865, at least one of the magnitude, duration, or delay for the undershoot has been set, so the method 800-*a* includes adjusting the undershoot based on the set parameters. At block 870, the overshoot is applied. At block 875, the undershoot is applied according to the set parameters, after the overshoot has been applied.

At block 880, the method 800-*a* determines if the bit write duration in time is greater than or equal to a threshold bit length in time. If so, the method 800-*a* truncates the undershoot at block 885. The method 800-*a* then returns the write current to the write steady state value at block 890. At block 895, the method 800-*a* further includes finishing writing the bit to the disc.

In some examples, aspects from the methods 800 and 800-*a* may be combined and/or separated. It should be noted that the methods 800 and 800-*a* is just an example implementation, and that the operations of the methods 800 and 800-*a* may be rearranged or otherwise modified such that other implementations are possible.

The techniques described herein differ from other pattern dependent write methods that simply boost 1 T current to enhance write-ability by instead attacking the de-magnetization/torque issue associated with long transitions themselves rather than just adding more current to the short transitions without dealing with the long time constant it takes to pull the head out of saturation from the prior bit. This may also enhance the STE and ATI performance.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, and/or other optical disc storage, magnetic disc storage or other magnetic storage devices, or any other medium that can be used to carry or store desired program code means in the form of instructions or data structures and that can be accessed by a general-purpose or special-purpose computer, and/or a general-purpose or special-purpose processor. Disc, as used herein, includes compact disc (CD), laser disc, optical disc, digital versatile disc (DVD), floppy disc and Blu-ray disc where discs usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, and/or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for writing bits in a magnetic recording disc, comprising:
    applying an overshoot to a write current which is supplied to a magnetic writer of the magnetic recording disc;
    applying an undershoot to the write current after the overshoot is applied to at least partially de-saturate the magnetic writer; and
    writing a bit to the magnetic recording disc with the magnetic writer using the supplied write current, wherein applying the undershoot comprises applying a short pulse of current to the write current during a write operation that writes the bit to the magnetic recording disc.

2. The method of claim 1, further comprising:
    determining an undershoot current level for the undershoot based at least in part on an overshoot current level of the overshoot; and
    wherein applying the undershoot further comprises applying the undershoot current level to the magnetic writer.

3. The method of claim 1, further comprising:
    determining a write width of a previous bit written to the magnetic recording disc; and
    adjusting an undershoot current level for the undershoot based at least in part on the write width.

4. The method of claim 1, further comprising:
    determining a bit length in time of the bit to be written to the magnetic recording disc; and
    wherein applying the undershoot to the write current further comprises applying the undershoot when the bit length is equal to or above a threshold bit length.

5. The method of claim 1, further comprising:
    determining at least one of a magnitude, duration, and delay of the undershoot;
    wherein applying the undershoot further comprises applying the undershoot with at least one of the determined magnitude of the undershoot, a duration of the undershoot, and a delay before the undershoot is applied.

6. The method of claim 5, further comprising:
    truncating a time the undershoot is applied to the write current when the duration of the undershoot plus the delay before the undershoot is applied is greater than a bit cell time.

7. The method of claim 1, wherein applying the undershoot further comprises:
    applying a shift in one or more current pulses in the write current to produce an asymmetrical undershoot.

8. The method of claim 1, further comprising:
    returning the write current to a steady state value before a next data transition.

9. The method of claim 1, wherein a current value of the undershoot is one of greater than or equal to a current steady-state value and less than or equal to a current steady-state value.

10. The method of claim 1, wherein applying the undershoot to the write current further comprises:
    waiting for a delay period to expire after the overshoot is applied; and
    applying the undershoot to the write current after a delay period has expired.

11. The method of claim 1, further comprising:
    determining a duration of the undershoot; and
    wherein applying the undershoot further comprises applying the undershoot for the determined duration.

12. The method of claim 1, further comprising:
    receiving an external signal that signals a timing, magnitude, and duration for the undershoot; and
    applying the undershoot to the write current according to the external signal.

13. A device comprising:
    a preamplifier to supply a write current to a magnetic writer of a storage device; and
    a write current device coupled between the preamplifier and the magnetic writer, wherein the write current device is configured to:
        apply an overshoot to a write current which is supplied to the magnetic writer; and
        apply an undershoot to the write current after the overshoot is applied to at least partially de-saturate the magnetic writer, wherein the magnetic writer writes a bit to the storage device using the modified write current, and wherein applying the undershoot comprises applying a short pulse of current to the write current during a write operation that writes the bit to the magnetic recording disc.

14. The device of claim 13, wherein the write current device is further configured to determine an undershoot current level for the undershoot based at least in part on an overshoot current level of the overshoot, wherein applying the undershoot further comprises applying the undershoot current level to the magnetic writer.

15. The device of claim 13, wherein the write current device is further configured to determine a write width of a previous bit written to the magnetic recording disc and adjust an undershoot current level for the undershoot based at least in part on the write width.

16. The device of claim 13, wherein the write current device is further configured to determine a bit length in time of the bit to be written to the magnetic recording disc, wherein applying the undershoot to the write current further comprises applying the undershoot when the bit length is equal to or above a threshold bit length.

17. The device of claim 13, wherein the write current device is further configured to determine at least one of a magnitude, duration, and delay of the undershoot, wherein applying the undershoot further comprises applying the undershoot with at least one of the determined magnitude of the undershoot, a duration of the undershoot, and a delay before the undershoot is applied.

18. A storage system apparatus comprising:
- a storage device having a magnetic write head;
- a preamplifier to supply a write current to the magnetic write head; and
- a write current device coupled between the preamplifier and the storage device, wherein the write current device modifies the write current supplied to the magnetic write head by applying an overshoot to the write current and applying an undershoot to the write current after the overshoot is applied to at least partially de-saturate the magnetic write head, wherein the magnetic write head writes a bit to the storage device using the modified write current, and wherein applying the undershoot comprises applying a short pulse of current to the write current during a write operation that writes the bit to the magnetic recording disc.

\* \* \* \* \*